United States Patent [19]

Wood et al.

[11] Patent Number: 4,775,218
[45] Date of Patent: Oct. 4, 1988

[54] COMBINER ALIGNMENT DETECTOR FOR HEAD UP DISPLAY SYSTEM

[75] Inventors: Robert B. Wood, Hillsboro; Mark A. Thomas, Lake Oswego; Thomas E. Hodel; Robert E. Stockwell, both of Beaverton, all of Oreg.

[73] Assignee: Flight Dynamics, Inc., Portland, Oreg.

[21] Appl. No.: 39,513

[22] Filed: Apr. 17, 1987

[51] Int. Cl.⁴ .................... G02B 27/14; H01Q 1/28; H04N 7/18; H04N 5/72
[52] U.S. Cl. .................... 350/174; 350/632; 340/705; 358/93; 358/250
[58] Field of Search .................... 350/174, 169, 632; 340/705, 718, 716; 358/93, 103, 250; 356/400

[56] References Cited

U.S. PATENT DOCUMENTS

3,620,601 11/1971 Waghorn .......................... 358/250
3,666,887 5/1972 Freeman .......................... 358/250
4,582,389 4/1986 Wood et al. ...................... 350/174

Primary Examiner—John K. Corbin
Assistant Examiner—Ronald M. Kachmarik
Attorney, Agent, or Firm—Stoel Rives Boley Jones & Grey

[57] ABSTRACT

A head up display system includes a combiner alignment detector (24) that determines whether the combiner (22) and a cathode-ray tube (CRT) (18) are aligned within a preassigned operational tolerance. The CRT emits display symbology that reflects off the combiner toward an observer. The combiner is secured to a combiner bracket (38) which is pivotally mounted to a mounting structure (70) having a stationary relationship with the CRT. A light emitting diode (LED) (86) and a light-sensitive linear position detector (88) are secured to the mounting structure. Light rays emanating from the LED are reflected by a mirror (34), which is secured to the combiner bracket, and strike the position detector. Pivotal motion of the combiner bracket relative to the mounting structure results in movement of the mirror relative to the LED and the position detector. The pivotal motion of the mirror causes light reflected by the mirror to strike varying locations on the position detector, which provides corresponding output signals. A processing circuit (110) receives the signals provided by the detector and provides to a control circuit (129) a signal corresponding to the alignment of the combiner and the CRT and to the position of the display symbology reflected by the combiner. The control circuit provides a warning signal whenever the information provided by the processing circuit indicates that the display symbology is not located at a preselected position.

13 Claims, 4 Drawing Sheets

COMBINER ALIGNMENT DETECTOR FOR HEAD UP DISPLAY SYSTEM

TECHNICAL FIELD

The present invention relates to head up display systems in which an image source projects symbology onto a combiner and, in particular, to mechanisms for determining whether the combiner and the image source are properly aligned within a preassigned tolerance.

BACKGROUND OF THE INVENTION

One type of head up display system for aircraft includes a cathode-ray tube (CRT) image source and a projection lens system that are mounted over and behind the pilot's head, and a stowable combiner that is positioned in a pilot's direct line-of-sight when the combiner is deployed for in-flight use. Visual flight information in the form of display symbology emanates from the CRT. Such information passes through the lens system and reflects off the combiner toward the pilot's eyes so that the display symbology appears to be coming from optical infinity. The display symbology is superimposed over the real world scene viewed by the pilot. The display symbology indicates, for example, the projected flight path of the aircraft ("aircraft symbology") relative to a fixed real world reference location, such as a runway. The aircraft symbology is projected toward a fixed location on the combiner in response to control signal information provided by a flight control system. The location of the aircraft symbology relative to the view of the runway observed through the combiner provides information which the pilot uses to control the flight path of the aircraft.

The combiner and the CRT must be spatially aligned within a preassigned operational tolerance to provide information to the pilot that accurately overlays the real world scene. Whenever the combiner and the CRT are misaligned by an amount exceeding the operational tolerance, display symbology will not conform to the real world, i.e., the locations of the aircraft symbology on the combiner will not correspond to the actual position of the aircraft relative to the runway. The resulting presentation of erroneous information without warning during, for example, aircraft landing manuevers may cause the pilot to direct the flight of the aircraft along an unsafe approach path to the runway.

SUMMARY OF THE INVENTION

An object of the present invention is, therefore, to provide a head up display system that includes an alignment detector which detects the relative spatial alignment of the combiner and the image source.

Another object of this invention is to provide such a combiner alignment detector that detects the spatial alignment of the image source and the combiner to determine whether display symbology is accurately positioned on the combiner.

A further object of this invention is to provide in a head up display system for aircraft a combiner alignment detector that alerts a pilot to the display of erroneous information resulting from spatial misalignment of the combiner and the image source.

The head up display system of the present invention comprises a combiner element which is mounted on a stowable support structure positioned in a pilot's direct line-of-sight and which is configured to superimpose display symbology over a real world scene. The display symbology emanates from a stationary image source and is projected toward preselected positions on the combiner. The system further comprises a combiner alignment detector which detects the relative spatial alignment of the combiner and the image source and which includes a processing circuit to determine whether the combiner and the image source are aligned within a preassigned operational tolerance. The processing circuit provides to a control circuit information that relates to the position of the display symbology on the combiner. The control circuit develops an error signal whenever the information indicates that display symbology is not located at the preselected position.

The combiner alignment detector also includes means to alert an observer, such as the pilot of an aircraft, to the display of erroneously positioned symbology resulting from misalignment of the combiner and the image source.

Additional objects and advantages of the present invention will be apparent from the following detailed description of a preferred embodiment thereof, which proceeds with reference to the accompanying drawings.

DETAILED DESCRIPTION OF PREFERRED EMBODIMENT

Figure 1:
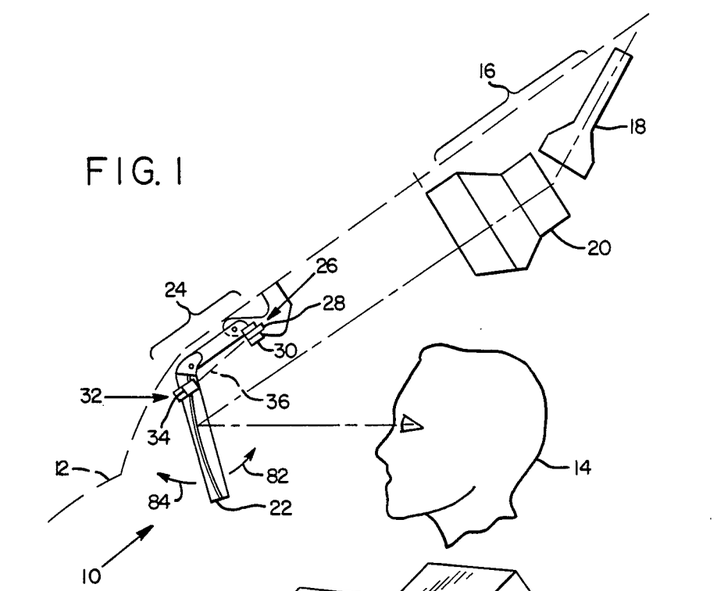
FIG. 1 is a diagrammatic side view of a head up display system installed in an aircraft cockpit and having a combiner alignment detector of the present invention.

FIG. 1 is a diagrammatic side view of a head up display system 10 that is installed in an aircraft cockpit 12 to provide to a pilot 14 flight information in the form of display symbology. With reference to FIG. 1, head up display system 10 includes a stationary data projection system 16 that comprises an image source or cathode-ray tube (CRT) 18, from which emanates the display symbology, and a relay lens 20, which projects the display symbology onto a stowable combiner 22. The image source 18 and relay lens 20 are fixed to the cockpit ceiling structure (not shown). When it is deployed for in-flight use, combiner 22 is positioned in the pilot's direct line-of-sight and superimposes the display symbology emanating from the CRT 18 on the outside world scene viewed by the pilot. Combiner 22 is positioned so that the display symbology viewed by the pilot appears to be coming from optical infinity. Combiner 22 is preferably of, but need not be restricted to, the holographic type such as that described in U.S. Pat. No. 4,582,389 of Wood et al.

Head up display system 10 also includes a combiner alignment detector 24 of the present invention. Combiner alignment detector 24 comprises a first optical subassembly 26, which includes a light source 28 and a light-sensitive linear position detector 30, and a second optical subassembly 32, which includes a light-reflecting surface or mirror 34. Light source 28 emits a narrow beam of light rays that propagate along an optical path 36. The light rays reflect off mirror 34 and strike position detector 30 at a location that corresponds to the orientation of combiner 22 relative to projection system 16, as will be described below.

Figure 2:
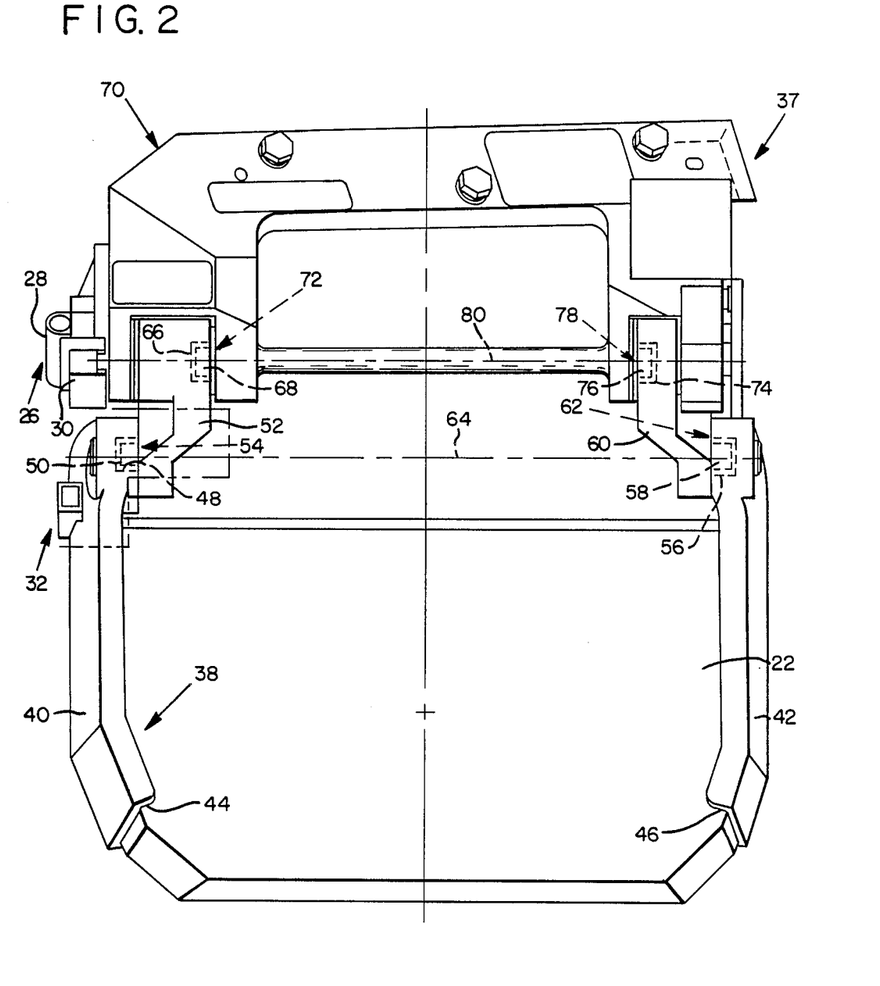
FIG. 2 is a diagram showing a pilot's view of a stowable combiner in the deployed position and the combiner alignment detector of the present invention mounted to the support structure for the combiner.

With reference to FIG. 2, combiner 22 is secured to a support structure 37 that includes a combiner bracket 38. Combiner bracket 38 comprises a left support arm 40 and a right support arm 42 that include respective U-shaped channels 44 and 46, which receive the side edges of and provide support for combiner 22. One end of the left support arm 40 has a bore 48 that receives and cooperates with a boss 50 that projects from the lower end of a left extension arm 52 to provide a first pivot joint 54. Right support arm 42 has a bore 56 which receives and cooperates with a boss 58 projecting from the lower end of a right extension arm 60 to provide a second pivot joint 62. A line connecting the centers of pivot joints 54 and 62 defines a break-away axis 64 about which combiner 22 pivots in an emergency situation to a noninterfering position 65, which is shown in phantom in FIG. 3. Combiner 22 pivotally moves into the noninterfering position in a direction into the plane of FIG. 2, away from the pilot.

The left extension arm 52 and right extension arm 60 are pivotally connected at their upper ends to a mounting bracket 70 which is rigidly secured to the cockpit ceiling structure (not shown). More particularly, left extension arm 52 has a bore 66 which receives and cooperates with a boss 68 projecting from the mounting bracket 70 to provide a third pivot joint 72. Right extension arm 60 has a bore 74 which receives and cooperates with a boss 76 projecting from stationary mounting bracket 70 to provide a fourth pivot joint 78. A line connecting the centers of pivot joints 72 and 78 defines a pivot axis 80 about which combiner 22 pivots into a stowed position 79, which is shown in phantom in FIG. 3. Combiner 22 pivotally moves into the stowed position in a direction out of the plane of FIG. 2, toward the cockpit ceiling. Preferably, conventional detent mechanisms are incorporated into the support structure 37 at each pivot joint 52, 62, 72, and 78 in order to secure the combiner in the noninterfering, deployed, or stowed position.

First optical subassembly 26 is secured to mounting bracket 70 and is, therefore, in a stationary relationship with image source 18, which is also fixed to the cockpit ceiling structure. Second optical subassembly 32 is secured to left support arm 40 of combiner bracket 38 and is, therefore, in a stationary relationship with combiner 22.

Figure 3:
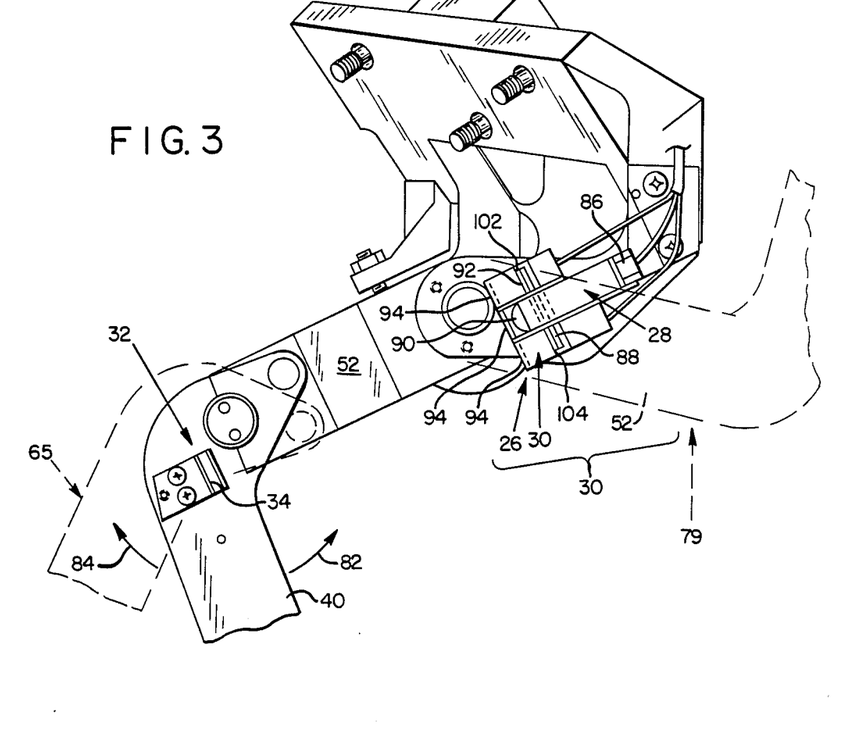
FIG. 3 is a side elevation view of the combiner alignment detector of the present invention.

Occasionally combiner 22 may become mispositioned relative to projection system 16 by an amount that is greater than an operational tolerance. Such mispositioning can take place, for example, by excessive wear in any of the pivot joints 54, 62, 72, and 78. Combiner misposition will also result when the combiner is not precisely returned to the deployed position from the noninterfering position or stowed position due to malfunction of the detent mechanisms mentioned above. With reference to FIGS. 1 and 3, direction arrows 82 and 84 indicate directions of pivotal motion in which combiner 22 may be mispositioned relative to projection system 16. Direction arrow 82 indicates the direction in which combiner 22 pivotally moves about axis 80 toward the stowed position 79, and direction arrow 84 indicates the direction in which combiner 22 moves about axis 64 toward the noninterfering position 65. Combiner alignment detector 24 detects the mispositioning of the combiner resulting from such pivotal motion by an amount that exceeds the operational tolerance.

Figure 4:
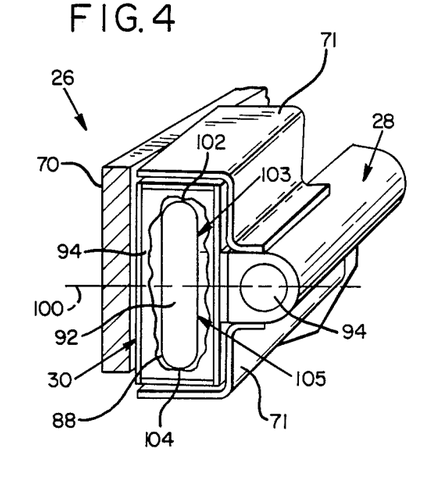
FIG. 4 shows the arrangement of a light-sensitive linear position detector, with a portion broken away, and a light source employed in the combiner alignment detector of the present invention.

With reference to FIGS. 3 and 4, light source 28 and position detector 30 of first optical subassembly 26 include, respectively, an infrared light emitting diode (LED) 86 and a linear, light-sensitive position detector 88. LED 86 can be, for example, model number SFH482 manufactured by Siemans, and position detector 88 can be, for example, model number S1544 manufactured by Hamamatsu. The LED 86 and detector 88 are mounted within a housing 71 that is fixed to mounting bracket 70. LED 86 emits light rays that propagate along optic axis 36 and strike mirror 34. Mirror 34 folds the optical path that extends along optic axis 36 between a lens 90 and a light-receiving surface 92 of linear position detector 8. Lens 90 focuses such light rays onto light-receiving surface 92 of linear position detector 88. Infrared selective filter 94 of first optical subassembly 26 rejects wavelengths of light that are not within the bandwidth of the light emitted by LED 86.

Light rays emanating from LED 86 that are reflected by mirror 34 back to light-receiving surface 92 of linear detector 88 strike that surface 92 at a location which corresponds to the orientation of combiner 22 relative to projection system 16. More particularly, with reference to FIG. 4, the light-receiving surface 92 of linear detector 88 has a center line 100 that is equidistant from the top side 102 and the bottom side 104 of light-receiving surface 92. The light rays which emanate from LED 86 and which strike surface 92 form thereon a spot having a diameter that is much smaller than the distance between top side 102 and bottom side 104. The linear detector 88 is constructed to provide a first or top output signal and a second or bottom output signal, the amplitudes of which are proportional to the distance between the spot and top side 102 and bottom side 104, respectively. When the spot is positioned on center line 100, the top and bottom output signals are of equal amplitude. As the spot moves closer to one of the sides 102 and 104, the signal corresponding to the side nearer to the spot increases in amplitude and the signal corresponding to the side farther from the spot decreases in amplitude.

Whenever the combiner 22 is in the deployed position and properly aligned with projection system 16, mirror 34 reflects the light emanating from LED 86 to strike the center line 100 of light-receiving surface 92. Under these conditions, linear detector 88 develops two equal-amplitude output signals.

Whenever combiner 22 is mispositioned in the direction indicated by arrow 82, the surface of mirror 34 is oriented along a first misaligned plane that is angled such that the light emanating from LED 86 is reflected to a top detection half 103 of light-receiving surface 92. Accordingly, the amplitude of the top output signal is greater than that of the bottom output signal. The output signals are then processed to provide an indication of the amount of misalignment of the combiner in the direction indicated by arrow 82.

Whenever combiner 22 is mispositioned in the direction indicated by arrow 84, the surface of mirror 34 is oriented along a second misaligned plane that is angled such that the light emanating from LED 86 is reflected to a bottom detection half 105 of light-receiving surface 92. Accordingly, the amplitude of the top output signal is less than that of the bottom output signal. The output signals are then processed to provide an indication of amount of the misalignment of the combiner in the direction indicated by arrow 84.

In the preferred embodiment described above, the amplitudes of the top and bottom output signals vary linearly from zero to positive values. The difference between the amplitudes of the top and bottom output signals varies, therefore, linearly from a positive value to a negative value as the location at which the light directly strikes light-receiving surface 92 moves along a straight line from the top side 102 to bottom side 104, respectively.

Figure 5:
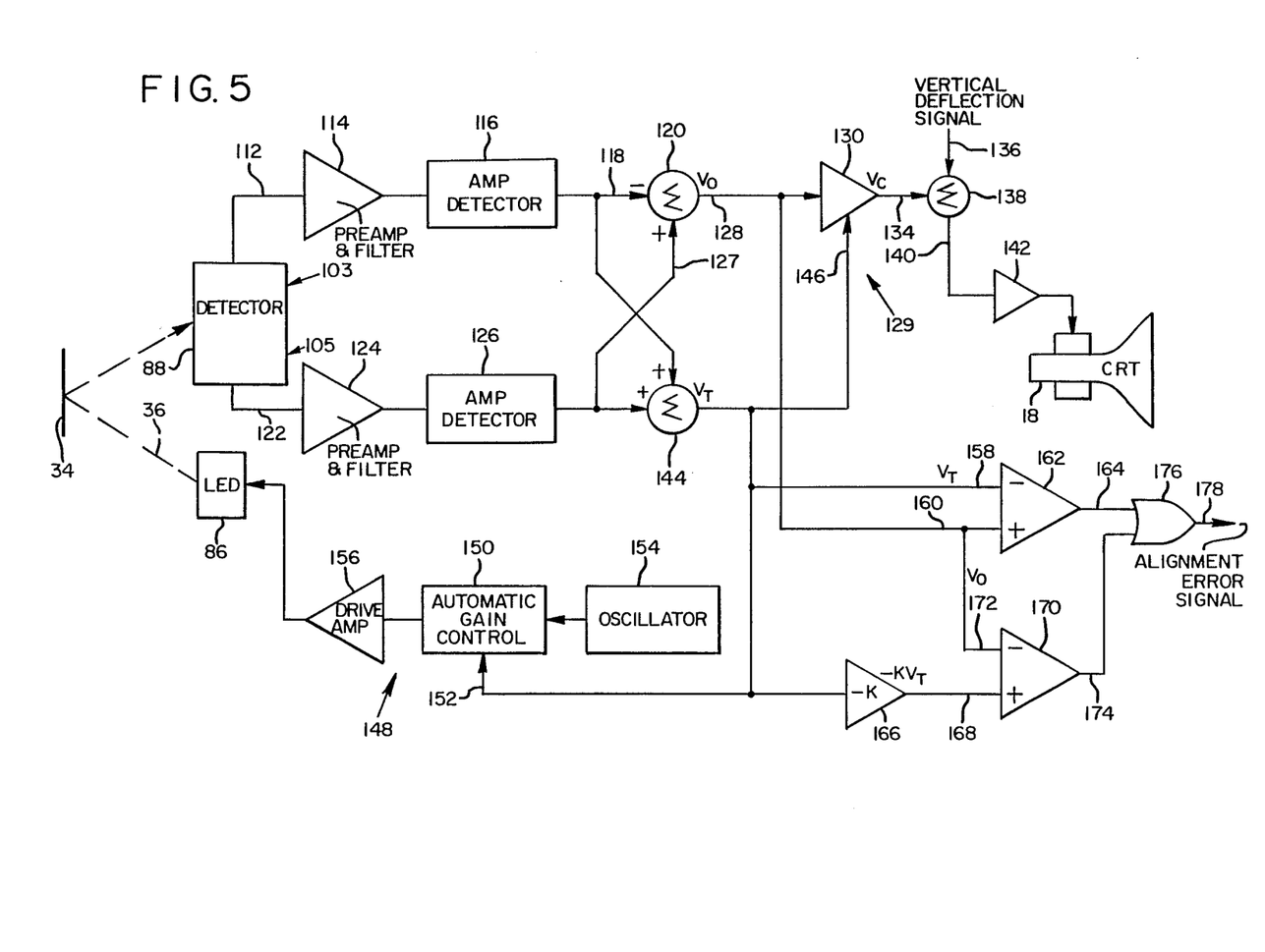
FIG. 5 is a block diagram of circuitry for processing electrical signals developed by the combiner alignment detector of the present invention.

FIG. 5 shows a processing circuit 110 that determines whether the top and bottom output signals of linear detector 88 have equal amplitudes. In the preferred embodiment, the light output of LED 86 changes from zero to maximum intensity at about a 10 KHz rate. This change in the LED light output intensity is accomplished by modulating the drive current of LED 86 at a 10 KHz rate as described below. Processing circuit 110 is operable either to determine whether the magnitude of an error output signal, $V_O$, exceeds a threshold voltage range corresponding to an operational tolerance or to reposition the symbology to correct the display thereof relative to the outside world scene.

With reference to FIG. 5, the top output signal appears on a conductor 112 and drives a preamplifier 114 having the frequency response characteristic of a high pass filter to attenuate low frequency noise. An amplitude detection circuit 116 receives and rectifies the output signal from preamplifier 114, and delivers a voltage representing the magnitude of the top output signal to the negative input 118 of a difference network 120. Similarly, the bottom output signal appears on a conductor 122 and drives a preamplifier 124 having the frequency response characteristic of a high pass filter. An amplitude peak detection circuit 126 receives and rectifies the output signal from preamplifier 124, and delivers a voltage representing the magnitude of the bottom output signal to the positive input 127 of difference network 120.

Misalignment of combiner 22 with projection system 16 including CRT 18 is represented by the error output voltage $V_O$, which appears on output 128 of difference network 120. The error output signal $V_O$ drives a control circuit 129 that includes a variable gain amplifier 130, whose gain is changeable as described below. At the nominal gain value, amplifier 130 provides at its output a deflection correction signal representing a scaled version of the error output voltage $V_O$. This deflection correction signal $V_C$ and a vertical deflection signal are applied to the respective inputs 134 and 136 of a voltage summer 138, Whose output 140 drives a vertical deflection amplifier 142 to position the symbology on the display screen of CRT 18. The deflection correction signal $V_C$ changes the vertical deflection signal by the proper amount to offset the symbology displacement resulting from combiner misalignment.

A voltage summer and divider 144 receives the output signals of amplitude detection circuits 116 and 126 and provides an output voltage signal, $V_T$, which is nominally of constant value and is equal to the sum of such signals divided by a constant. Although its value is nominally constant, the $V_T$ signal magnitude can vary as a result of several factors, such as, for example, a decrease in efficiency of LED 86 or the presence of dirt on mirror 34. This would result in a deflection correction signal of lower voltage and a consequent erroneous displacement of the symbology on the display. The $V_T$ signal is applied to the gain control input 146 of variable gain amplifier 130 to change the gain and restore the voltage of the deflection correction signal to the nominal level.

A LED control circuit 148 operates to maintain the light output of LED 86 at a nominal constant intensity. LED control circuit 148 is responsive to the magnitude of the $V_T$ signal and adjusts the intensity of light provided by LED 86 whenever the $V_T$ signal magnitude differs from its nominal constant value. Control circuit 148 includes an automatic gain control circuit 150 having a control input 152 that receives the $V_T$ signal. An oscillator circuit 154 provides a 10 KHz modulation signal to gain control circuit 150, which attenuates the 10 KHz signal by an amount that is inversely proportional to the magnitude of the $V_T$ signal. A drive amplifier 156 of fixed gain provides to LED 86 a modulated drive current of an amplitude that is inversely proportional to the $V_T$ signal magnitude.

The $V_T$ signal can also be applied together with the error output signal $V_O$ to the respective negative input 158 and positive input 160 of a voltage comparator 162 to determine whether the error output signal $V_O$ is greater than a positive threshold voltage $V_T$. Whenever the $V_O$ signal is greater than the $V_T$ level, the output 164 of comparator 162 is in the logic 1 state, thereby indicating that the combiner is mispositioned by an amount that exceeds the positive threshold amount. An inverting amplifier 166 of fixed gain $-K$ receives the $V_T$ signal and provides to the positive input 168 of a voltage comparator 170 a negative threshold voltage $-KV_T$. The error output signal $V_O$ is applied to the negative input 172 of voltage comparator 170, which provides at its output 174 an indication of whether error output signal $V_O$ signal is less than negative threshold voltage $-KV_T$. Whenever the $V_O$ is less than the $-KV_T$ level, the output 174 of comparator 170 is in the logic 1 state, thereby indicating that the combiner is mispositioned more than the negative threshold amount.

An OR gate 176 receives the signals on outputs 164 and 174 of the respective comparators 162 and 170. Whenever it receives a signal in the logic 1 state, OR gate 176 provides at its output 178 a signal in the logic 1 state, thereby indicating the presence of a combiner alignment error. The signal at output 178 of OR gate 176 can then be used to inform the pilot of the misalignment by projecting onto the viewing surface of combiner 22 a warning symbol to be viewed by the pilot. Such a warning may also constitute the interruption of the projection of the symbology onto the display.

By setting the gain $-K$ of inverting amplifier 166 at a value of other than $-1$, it is possible to select different positive and negative threshold amounts which correspond to combiner movement in respective directions 82 and 84. The comparison of the $V_O$ signal against the $V_T$, and $-KV_T$, signals provide voltage comparisons that are insensitive to a reduction in light output intensity of LED 86. This would not be true if a fixed reference voltage was substituted for the $V_T$, and $-KV_T$ signals.

Figure 6A:
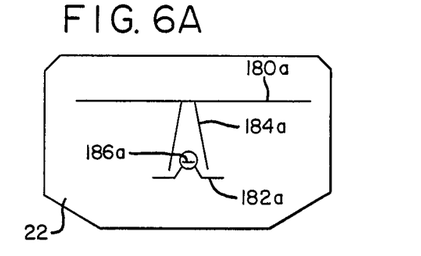
FIG. 6A shows the display symbology reflected from a properly aligned combiner when an aircraft is moving along a desired flight path.
Figure 6B:
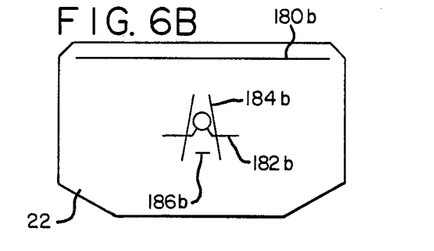
FIG. 6B shows the display symbology reflected from a combiner mispositioned in the direction away from the pilot such that the symbology would misdirect the pilot to deviate the course of an aircraft to a lower than desired flight path.
Figure 6C:
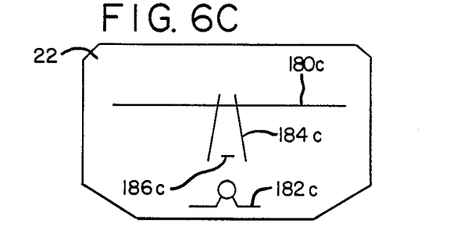
FIG. 6C shows the display symbology reflected from a combiner mispositioned in the direction toward the pilot such that the symbology would misdirect the pilot to deviate the course of an aircraft to a higher than desired flight path.
Figure 7:
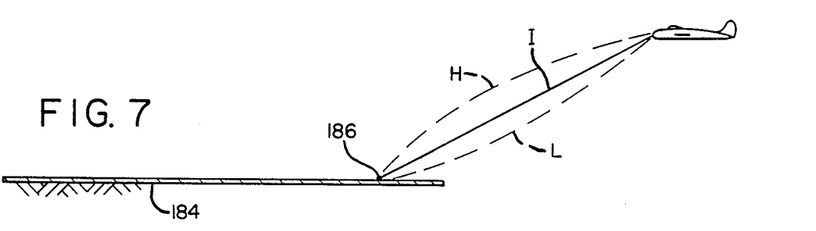
FIG. 7 is a diagram illustrating the various effects on the flight path when a pilot follows display symbology that is reflected from a mispositioned combiner.

FIGS. 6A-6C show the visual effect of misalignment of combiner 22 relative to projection system 16 and indicate that pivotal movement of combiner 22 in the directions of arrows 82 and 84 (FIG. 3) causes a vertical displacement of the symbology displayed to the pilot with respect to the real world scene. FIGS. 6A-6C show symbology that includes a horizon symbol 180 and a flight path vector symbol 182. The actual edges of the runway 184 and the nominal touchdown point 186 on the runway are also shown in FIGS. 6A-6C. The symbology reference numerals have suffixes a, b, c that correspond to the FIGS. 6A, 6B, and 6C, respectively, in which they appear. FIG. 7 shows the effects on the actual flight path of the aircraft when the pilot guides the aircraft in response to the display symbology shown in FIGS. 6A-6C.

FIG. 6A shows the symbology 180a, 182a that the pilot would view whenever the aircraft is correctly approaching a runway 184a and combiner 22 is correctly aligned with projection system 16 within the operational tolerance. The correct or ideal flight path, i.e., the flight path of an aircraft on a perfect 3° glideslope, is indicated as line "I" in FIG. 7.

FIG. 6B shows the symbology 180b, 182b that the pilot would view whenever the aircraft is correctly approaching the runway 184b and combiner 22 is mispositioned in the direction of arrow 84 by an amount which is outside the operational tolerance. Position symbology 180b, 182b would erroneously indicate to the pilot that he is overshooting his touchdown point 186b. Without a warning symbol or other indicium as provided by this invention, the pilot would manuever the aircraft until the symbology 180b, 182b conforms to the correct approach symbology as shown in FIG. 6A. As shown in FIG. 7, such a manuever would result, however, in the deviation of the course of the aircraft from the ideal flight path "I" to an undesirable, generally lower flight path, indicated as line "L" in FIG. 7.

FIG. 6C shows the position symbology 180c, 182c that the pilot would view whenever the aircraft is correctly approaching a runway 184c and combiner 22 is mispositioned in the direction indicated by arrow 82 by an amount which is greater than the operational tolerance. Position symbology 180c, 182c would erroneously indicate to the pilot that he is undershooting his touchdown point 186c. Without a warning symbol or other indicium as provided by this invention, the pilot would manuever the aircraft until the position symbology conforms to the correct approach symbology as shown in FIG. 6A. As shown in FIG. 7, such a manuever would result, however, in the deviation of the course of the aircraft from the ideal flight path "I" to an undesirable, generally higher flight path, indicated as "H" in FIG. 7.

The above description has been directed to the use of a linear position detector 88. The present invention can also be practiced with a quadrature light-sensitive position detector, which would detect not only a mispositioning of combiner 22 in the directions of direction arrows 82 and 84, but also a mispositioning of combiner 22 into and out of the plane of FIG. 3.

It will be obvious to those having skill in the art that many changes may be made to the abovedescribed details of the preferred embodiment of the present invention without departing from the underlying principles thereof. The scope of the present invention should be determined, therefore, only by the following claims.

We claim:

1. In a head up display system having a movable combiner positioned in an observer's forward line-of-sight, the combiner being configured to superimpose on a scene display symbology emanating from a stationary image source, the symbology being projected from the image source toward a preselected position on the combiner and reflected from the surface of the combiner, the improvement comprising:
   detecting means for detecting the orientation of the combiner relative to the image source and including:
   (a) a light source;
   (b) a light reflector mounted near the surface of the combiner to be movable therewith;
   (c) a light detector, the light source, light reflector and light detector configured and arranged so that the light emanating from the light source is reflected by the light reflector to a position on the light detector that corresponds to the orientation of the combiner relative to the image source;
   processing means responsive to the detecting means to provide information corresponding to the position of the display symbology on the combiner, the position of the display symbology on the combiner being related to the orientation of the combiner relative to the image source; and
   control means in communication with the processing means and operable to provide a signal whenever the processing means indicates that the display symbology is not located at the preselected position.

2. The system of claim 1 in which the control means is in communication with the image source and includes means to deliver a signal to the image source to reposition the display symbology to the preselected position whenever the information indicates that the display symbology is not located in the preselected position.

3. The system of claim 1 in which the light source comprises a light emitting diode.

4. The system of claim 1 in which the light detector comprises a light-sensitive position detector.

5. The system of claim 1 wherein the combiner includes a hologram constructed to reflect light emanating from the image source and to transmit light emanating from the light source.

6. In a head up display system for aircraft having a holographic combiner positioned in an observer's line-of-sight, the combiner configured to superimpose display symbology on a real world scene, the display symbology emanating from a stationary image source and being projected toward a preselected position on the combiner, and the combiner being secured to a bracket that is pivotally mounted to a mounting structure, the improvement comprising:
- a light reflector secured to the bracket adjacent to the combiner and in optical communication with a light source secured to the mounting structure;
- a light-sensitive detector secured to the mounting structure and in optical communication with the light reflector;
- processing means responsive to the light-sensitive detector to provide information corresponding to the position of the display symbology on the combiner, the position of the display symbology on the combiner being related to the orientation of the combiner which is related to the pivotal position of the bracket; and
- control means in communication with the processing means to provide a signal whenever the information indicates that the display symbology is not located at the preselected position.

7. The system of claim 6 in which the image source is secured in a position above the observer.

8. The system of claim 6 in which the control means is in communication with the image source and includes means to interrupt the projection of the display symbology whenever the information indicates that the display symbology is not located at the preselected position.

9. The system of claim 6 in which the control means is in communication with the image source and includes means to deliver a signal to the image source to reposition the display symbology to the preselected position whenever the information indicates that the display symbology is not located in the preselected position.

10. The system of claim 6 in which the processing means further comprises first means for sensing the intensity of light received by the light-sensitive detector and second means responsive to the first means for adjusting the intensity of the light emanating from the light source, thereby to maintain the accuracy of the information corresponding to the position of the display symbology on the combiner.

11. A detector system for a head up display system, comprising:
- a stationary image source configured for projecting display symbology therefrom;
- a combiner mounted in the line of sight of an observer that utilizes the display system, the combiner reflecting the display symbology and being mounted for movement into and out of a predetermined deployed position;
- detection means for detecting and signaling when the combiner is not in the deployed position; and
- warning means interconnected between the detection means and the image source for directing the image source to project a warning symbol when the detection means signals that the combiner is not in the deployed position.

12. The system of claim 11 in which the detection means further comprises means to detect whether the combiner is mispositioned in a first direction by a first amount and means to detect whether the combiner is mispositioned in a second direction by a second amount.

13. The system of claim 12 in which the first and second amounts are different.

* * * * *

UNITED STATES PATENT AND TRADEMARK OFFICE
CERTIFICATE OF CORRECTION

PATENT NO. : 4,775,218

DATED : October 4, 1988

INVENTOR(S) : Robert B. Wood, Mark A. Thomas, Thomas E. Hodel, and Robert E. Stockwell It is certified that error appears in the above-identified patent and that said Letters Patent is hereby corrected as shown below:

Column 4, line 5, after "Occasionally" insert --,--.

Column 4, line 39, change "8" to --88--.

Column 6, line 6, change "Whose" to --whose--.

Column 7, line 10, after "$V_T$" delete ","; and after "$-KV_T$" delete ",".

Column 7, line 13, after "$V_T$" delete ",".

Column 8, line 9, change "abovedescribed" to --above-described--.

Signed and Sealed this

Twenty-first Day of March, 1989

*Attest:*

DONALD J. QUIGG

*Attesting Officer*      *Commissioner of Patents and Trademarks*